US012129151B2

(12) United States Patent
Kasbergen et al.

(10) Patent No.: US 12,129,151 B2
(45) Date of Patent: Oct. 29, 2024

(54) STAIRLIFT REMOTE CONTROL UNIT

(71) Applicant: TK HOME SOLUTIONS B.V., LN Krimpen aan den Ijssel (NL)

(72) Inventors: Paul Kasbergen, CM Capelle aan den Ijssel (NL); Cornelis Boxum, GV Delfgauw (NL); Wim Heijns, AL Kinderdijk (NL)

(73) Assignee: TK HOME SOLUTIONS B.V., LN Krimpen aan den Ijssel (NL)

( * ) Notice: Subject to any disclaimer, the term of this patent is extended or adjusted under 35 U.S.C. 154(b) by 12 days.

(21) Appl. No.: 17/928,173

(22) PCT Filed: Apr. 6, 2021

(86) PCT No.: PCT/EP2021/058875

§ 371 (c)(1),
(2) Date: Nov. 28, 2022

(87) PCT Pub. No.: WO2021/239306

PCT Pub. Date: Dec. 2, 2021

(65) Prior Publication Data

US 2023/0219786 A1 Jul. 13, 2023

(30) Foreign Application Priority Data

May 29, 2020 (EP) .................................... 20177313

(51) Int. Cl.
*B66B 1/34* (2006.01)
*B66B 1/24* (2006.01)
*B66B 9/08* (2006.01)

(52) U.S. Cl.
CPC .............. *B66B 1/3461* (2013.01); *B66B 9/08* (2013.01); *B66B 1/24* (2013.01)

(58) Field of Classification Search
CPC ............ B66B 1/3461; B66B 9/08; B66B 1/24
See application file for complete search history.

(56) References Cited

U.S. PATENT DOCUMENTS

2014/0375451 A1 12/2014 Douglas

FOREIGN PATENT DOCUMENTS

CA 2736676 A1 * 10/2011 ............... B66B 1/34
CN 201484768 U 5/2010

(Continued)

OTHER PUBLICATIONS

International Search Report dated May 19, 2021; International Application No. PCT/EP2021/058875.

(Continued)

*Primary Examiner* — Diem M Tran
(74) *Attorney, Agent, or Firm* — Dinsmore & Shohl LLP

(57) ABSTRACT

The present disclosure refers to a remote control unit adapted to control a stairlift, wherein the stairlift comprises, a rail, a drive unit having a platform, such as a chair or a lifting ramp for a wheelchair, for driving along the rail, a first control unit arranged at and connected to the drive unit. The remote control unit is arranged separately from the drive unit and is wirelessly connected to the drive unit. The first control unit and the remote control unit are adapted to control the drive unit independently of each other. The remote control unit is adapted to instruct the drive unit to perform multiple functions (A-J) via wireless transmission. The present disclosure also relates to a method of controlling a stairlift.

20 Claims, 7 Drawing Sheets

(56) References Cited

FOREIGN PATENT DOCUMENTS

| | | | | | |
|---|---|---|---|---|---|
| EP | 2377795 | A1 | | 10/2011 | |
| EP | 2923987 | A1 | | 9/2015 | |
| WO | WO-2007045837 | A1 | * | 4/2007 | ........... B66B 5/0031 |
| WO | WO-2013137730 | A1 | * | 9/2013 | ............... B66B 9/08 |
| WO | 2018052370 | A1 | | 3/2018 | |
| WO | 2018215238 | A1 | | 11/2018 | |
| WO | 2019238736 | A1 | | 12/2019 | |
| WO | 2020038794 | A1 | | 2/2020 | |
| WO | 2020049271 | A1 | | 3/2020 | |

OTHER PUBLICATIONS

Extended European Search Report dated Nov. 13, 2022; Application No. 20177313.2.

European Office Action dated Jun. 10, 2022; Application No. 20177313.2.

European Office Action dated Dec. 20, 2021; Application No. 20177313.2.

* cited by examiner

STAIRLIFT REMOTE CONTROL UNIT

CROSS REFERENCE TO RELATED APPLICATIONS

The present application is the U.S. National Stage of International Patent Application No. PCT/EP2021/058875, filed Apr. 6, 2021, which claims priority to European Patent Application 20177313.2 filed on May 29, 2020 the entire content of both are incorporated herein by reference in their entirety.

TECHNICAL FIELD

The present disclosure relates to a remote control unit adapted to control a stairlift, wherein the stairlift includes, a rail, a drive unit including a platform, e.g., a chair or a lifting ramp for a wheelchair, for driving, a first control unit arranged at and connected to—wirelessly or otherwise—the drive unit; wherein the first control unit and the remote control unit are adapted to control the drive unit independently of each other. The present disclosure also relates to a method of controlling said stairlift.

BACKGROUND

A stairlift is a product which is typically meant for people with impaired mobility to provide support in travelling up and down a staircase whilst maintaining the functionality of the stairs for persons who are able to climb the stairs themselves. The stairlift is often installed in a person's home and typically includes a drive unit that is arranged to drive a user carrier, e.g., a chair or a wheelchair platform, along a rail, mounted on or along one or more flights of a staircase.

ES 2584246 B1 discloses a mobile device which sends a wireless control signal to the wireless control board that is installed in a control panel, where the wireless control signal includes a control command. Actuators of the control panel control movement of a lifting platform or stairlift based on the control command.

CN 20484768 U discloses a call display box that can call the chair through a wireless connection.

The Applicant's application WO 2018215238 A1 also discloses a platform lift having call and park functionality using a speech communication device located at the drive unit of the platform lift, wherein a base station is located at a fixed location and one wireless transmission path connects both the control unit of the platform lift and the speech communication device to the base station.

EP 2377795 B1 discloses an activator which directly or indirectly activates a function interlock of the passenger lift system in response to the control unit being effectively introduced into the stray field, in order to switch the access control such that it is drive-enabled.

The Applicant's application WO 2019238736 A1 also discloses a stairlift including an authentication device wherein it can be any kind of one-lock multiple-keys system, deploying a wireless and/or physical lock and different wireless and/or physical keys. The stairlift is adapted to adjust its behavioural profile based on the signal emitter authenticated by the authentication device.

Whilst the lift systems described above have features that improve the functionality of the stairlift for the user, there remains room for improvement.

It would be highly desirable to have a stairlift that could be controlled by a user or an attendant person over any number of floors in a building, and still have the features of for example, being able to make an emergency call to a base station in cases of emergency.

SUMMARY

It is thus an object of the present disclosure, to provide a universal control unit for a stairlift wherein said control unit can be used to perform a plurality of functions in a stairlift.

This object is solved by a remote control unit and a method, with further embodiments detailed in the following description.

The present disclosure relates to a remote control unit adapted to control a stairlift, wherein the stairlift includes, a rail, wherein said rail is a curved rail, or a straight rail, or a combination of both, a drive unit having a platform, e.g., a chair or a lifting ramp for a wheelchair, for driving along the rail, a first control unit arranged at and connected to wirelessly or otherwise—the drive unit, and wherein the remote control unit is arranged separately from the drive unit, it is wirelessly connected to the drive unit, the first control unit and the remote control unit are adapted to control the drive unit independently of each other, and the remote control unit is adapted to instruct the drive unit to perform multiple functions (A-J) via wireless transmission.

This aspect provides a stairlift that can still be operated even when the first control unit is broken, or unavailable. The remote control unit can send a control signal via wireless transmission to the drive unit and therefore implement one or more function once it has paired with the drive unit. This pairing process can occur over various frequency ranges—however the frequencies do not constitute an embodiment of this present disclosure. An example of a pairing process used in a stairlift can be found in WO 2020/038794, which is herein incorporated by reference.

In an embodiment of the present disclosure, the multiple functions (A-J) include pairing (A) and at least one further function selected from the group including call and park (D), attendant control (B), and repeater (C).

To minimize the obtrusion of the drive unit when it is not in use, there is the possibility to park the drive unit at another position than e.g., the landing area ('call & park'-functionality). A rail can typically have any length up to 45 meters (m) therefore, this function is designed to operate within a range of up to 45 m from the drive unit. This ensures that the person using the remote control unit can operate the "Call & Park" function whilst not being in the direct vicinity of the drive unit.

In an embodiment of the present disclosure, the wireless transmission is adapted to transmit and receive a data signal from the remote control unit to a module located at the drive unit. For further information, the applicant incorporates by reference their patent EP 3406555 B1.

In an embodiment of the present disclosure, the multiple functions further include any one or more of call device (E), key lock (F), chair-user up/down control (G), stairlift lock (H), and service unit (J).

This aspect provides a remote control unit that can be programmed to perform a variety of functions, thereby improving passenger desirability and comfort.

In an embodiment of the present disclosure, a speech communication device e.g. a telephone, microphone, speaker, command button can be provided at the remote control unit for establishing a speech connection, e.g., a phone conversation, with a remote technical service, in case a fault occurs during travel. This is an example of a call device. This connection can be based for example on DECT technology, but is not necessarily limited thereto. A base station is needed to ensure the connection to a landline.

A keylock is a type of "authentication device" and is normally located at the stairlift, e.g., at the drive unit, or at the chair or at the lifting ramp for a wheelchair. In an embodiment of the present disclosure, the key lock is located at the remote control unit and can be any kind of one-lock multiple-key system, deploying a wireless and/or physical lock and/or different wireless and/or physical keys. Once the remote control unit pairs with the drive unit the key lock function can be activated. Normally RF-ID is used for the keylock function. In case longer-range RF-ID components are used, the signal receiver may also be arranged at, or attached to, a backrest, or a seat, or a platform of the user carrier.

The functions (A-J) are described in more detail in the following figure description.

In an embodiment of the present disclosure, the remote control unit is a key lock. This aspect provides a multi-functional remote control unit.

In an embodiment of the present disclosure, the platform includes a chair having a footrest, and at least one of the multiple functions (A-J) is adapted to control the folding and unfolding of the footrest. This can be for example, incorporated with the call and park and attendant control functionalities.

In an embodiment of the present disclosure, the platform includes a lifting ramp for a wheelchair, wherein the remote control unit is adapted to control the lifting ramp.

In an embodiment of the present disclosure, the lifting ramp further includes a guard. The guard is designed to hold the wheels of the wheelchair in place as required by the safety standard. The guard includes a plurality of panels on at least one side of the lifting ramp. In a non-limiting example, the plurality of panels are on at least three sides of the lifting ramp—wherein each panel is adapted to be folded and unfolded during mounting and dismounting of the lifting ramp. In another non-limiting example, the plurality of panels are on at all sides of the lifting ramp—wherein each panel is adapted to be folded and unfolded during mounting and dismounting of the lifting ramp.

In an embodiment of the present disclosure, the lifting ramp, including the guard and the plurality of panels, are adapted to be operated by the remote control device.

In an embodiment of the present disclosure, the remote control unit is adapted to control the drive unit from a distance in a range of up to 45 m. In another embodiment, the remote control unit is adapted to control the drive unit from a distance in a range of up to up to 35 m, e.g., Call & park. This aspect provides a stairlift that can be controlled from various points throughout the building, e.g., house, in which it is installed.

In an embodiment of the present disclosure, the remote control unit includes at least one of a mobile i.e. hand held remote control, a fixed device e.g., affixed to a wall of a building including the stairlift, and a smartphone. This aspect provides a stairlift that can be controlled via any one of a hand held device, or a fixed device, therefore catering to the various preferences of passengers and their families.

In an embodiment of the present disclosure, the remote control unit is adapted to replace the first control unit. This aspect provides a stairlift that can be completely controlled via a remote control unit and removes the need for a first control unit. It also ensures that if there is a fault at the control unit, the stairlift can still be operated, thereby improving passenger safety.

The present disclosure also relates to a method of controlling a stairlift including the method steps of providing a remote control unit according to any of the previous embodiments, selecting function (A) at the remote control unit to pair the remote control unit with the drive unit, and selecting at least one first further function (B-J) at the remote control unit.

In an embodiment of the present disclosure at least one second further function (B-J) is selected at the remote unit and/or the platform, e.g., the chair or the lifting ramp.

In an embodiment of the present disclosure, the "attendant control" function (B) is selected at the remote control unit and may be within a distance of up to 5 m. In another embodiment, the "attendant control" function (B) is selected at the remote control unit and may be within a distance of up to 4 m. In another embodiment, the "attendant control" function (B) is selected at the remote control unit and may be within a distance of up to 3 m of the platform.

In an embodiment of the present disclosure, the "call & park" function (D) is selected at the remote control unit within a distance in a range of up to 45 m from the platform.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
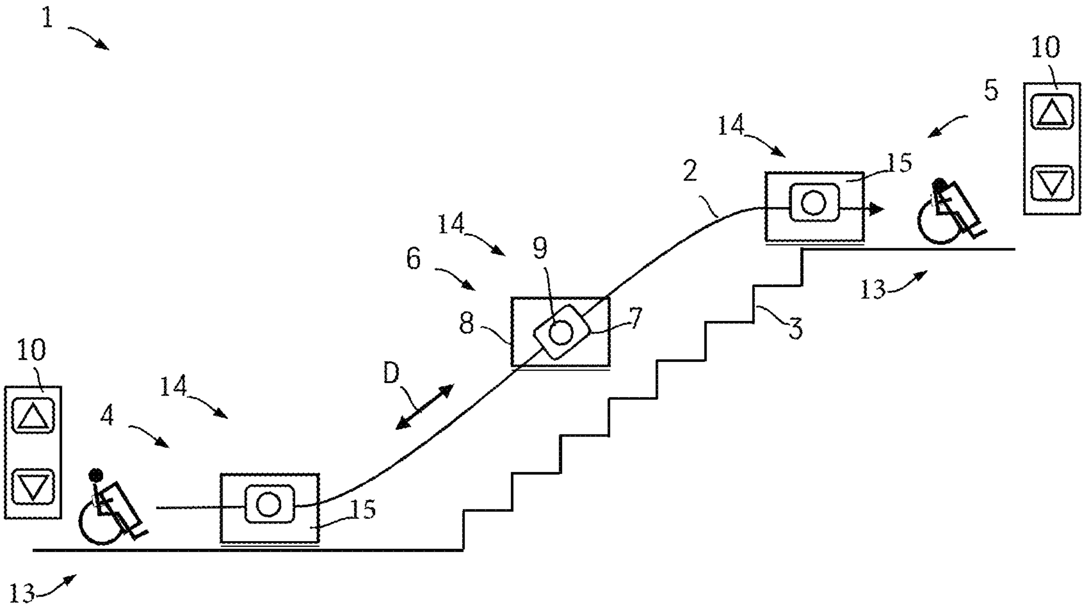
FIG. 1*a* shows a schematic representation of a stairlift in the art.

FIG. 1*a* shows a stairlift 1 for use with a wheelchair 13. The platform 8 includes a lifting ramp 14 which can travel along a direction of travel D from a first landing area 4 to a second landing area 5. The direction of travel D is defined by a rail 2 and can be limited by the course of an existing stairway 3 in a house. In an embodiment of the present disclosure, the lifting ramp 14 further includes a guard 15 designed or configured to hold the wheels of the wheelchair in place, as discussed ibn greater detail above.

In this example, the rail 2 has a curved shape, which deviates from a straight line; thus the direction of travel will change at least once during the course of the rail 2.

The platform 8 is comprised in a drive unit 6, wherein said drive unit 6 further includes a carrier 7. The carrier 7 has non-shown rollers, which roll along the rail 2. For driving the carrier 7 positive engagements component (shown in detail in FIG. 1*b*) are provided on the rail 2, which cooperates with a driving member, such as a driven pinion (not shown), of the drive unit 6. A leveling mechanism 9 is provided on the drive unit 6, to keep the platform 8 in a horizontal orientation, even if the inclination of the rail 2 varies during its course.

At the landing areas 4, 5 a call button device 10 is provided. By pressing a button of the call button device 10 a user located at the respective landing area 4, 5 can request that the platform 8 to move in a certain direction e.g. up or down or in direction of one of the landing areas 4, 5; this is known as a 'Call-and-Park'-function.

Figure 1B:
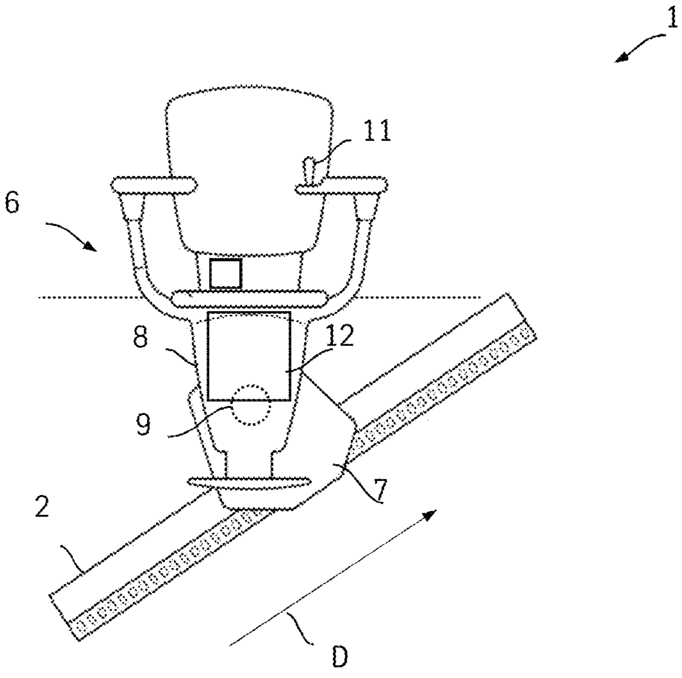
FIG. 1*b* shows a schematic representation of an alternative stairlift in the art.

FIG. 1*b* shows a stairlift 1 similar to the one shown in FIG. 1*a*, only instead of the platform 8 including a lifting ramp for a wheelchair, it now includes a chair for a user to sit on. A control unit 12 is arranged at the drive unit 6 as well as a control interface 11. The control interface enables the user on the chair 8 to give instructions to the drive unit 6 on the intended driving direction. As an example, the control interface 11 can be a button 11 or a joystick 11. In the example shown, the control interface 11 is a joystick.

Figure 1C:
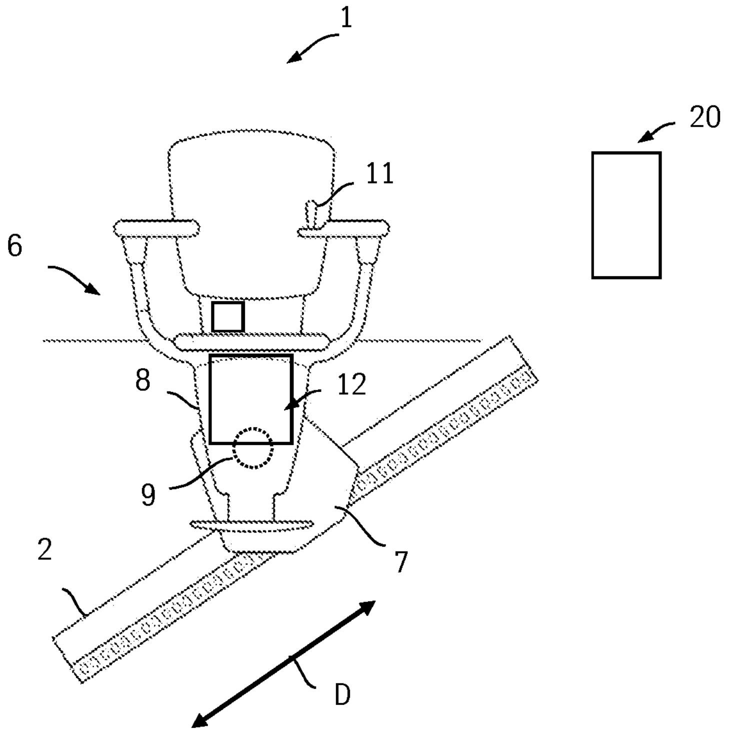
FIG. 1*c* shows a schematic representation of a stairlift according to one or more embodiments shown and described in the present disclosure.

The inventive stairlift 1 is now described in more detail with the help of FIGS. 1*c* to 6. FIG. 1*c* shows a stairlift 1 similar to the one shown in FIG. 1*b*, only now it includes a remote control unit 20 according to the present disclosure. The remote control unit 20 is separate from the drive unit 6 and does not need to be in the immediate vicinity of the stairlift 1. This will be explained in further detail below in relation to the specific functionalities.

Figure 2A:
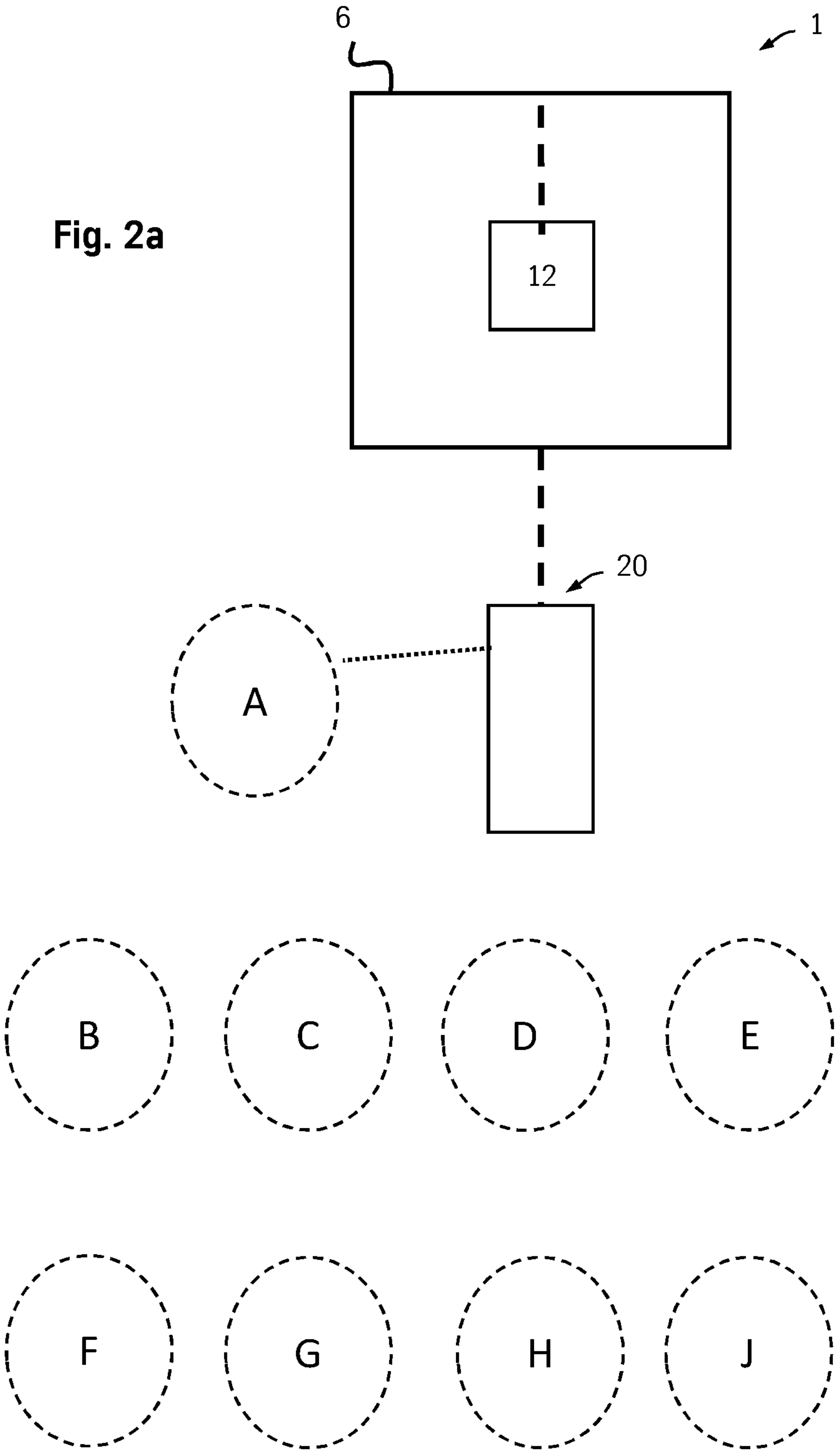
FIG. 2*a* shows a schematic representation of a control unit according to one or more embodiments shown and described in the present disclosure.
Figure 2B:
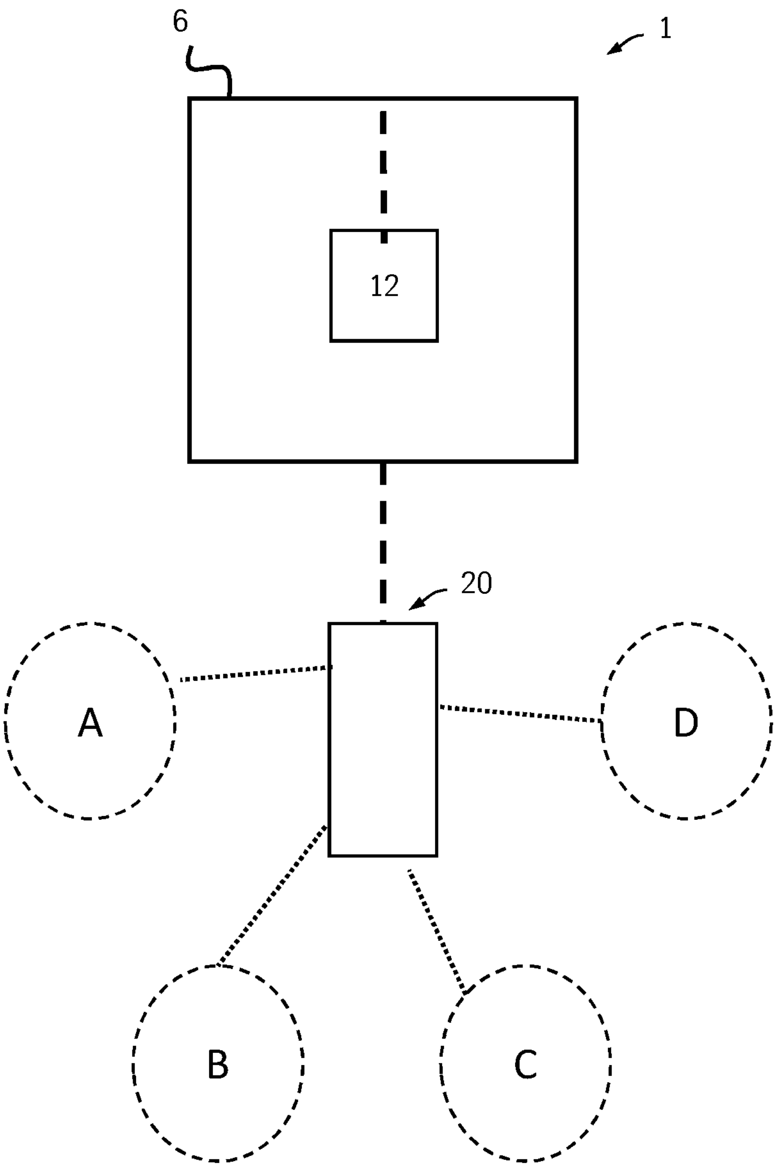
FIG. 2*b* shows a schematic representation of a control unit according to one or more embodiments shown and described in the present disclosure.
Figure 2C:
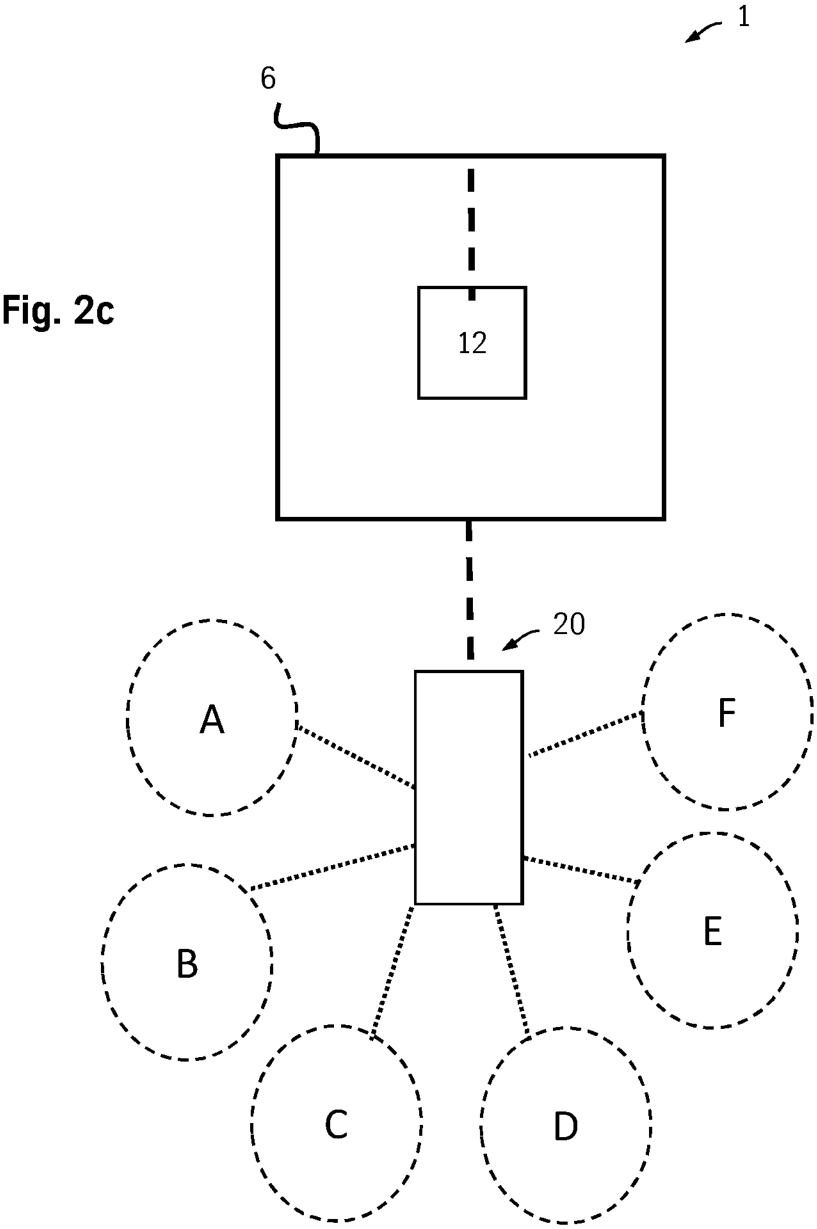
FIG. 2*c* shows a schematic representation of a control unit according to one or more embodiments shown and described in the present disclosure.
Figure 3:
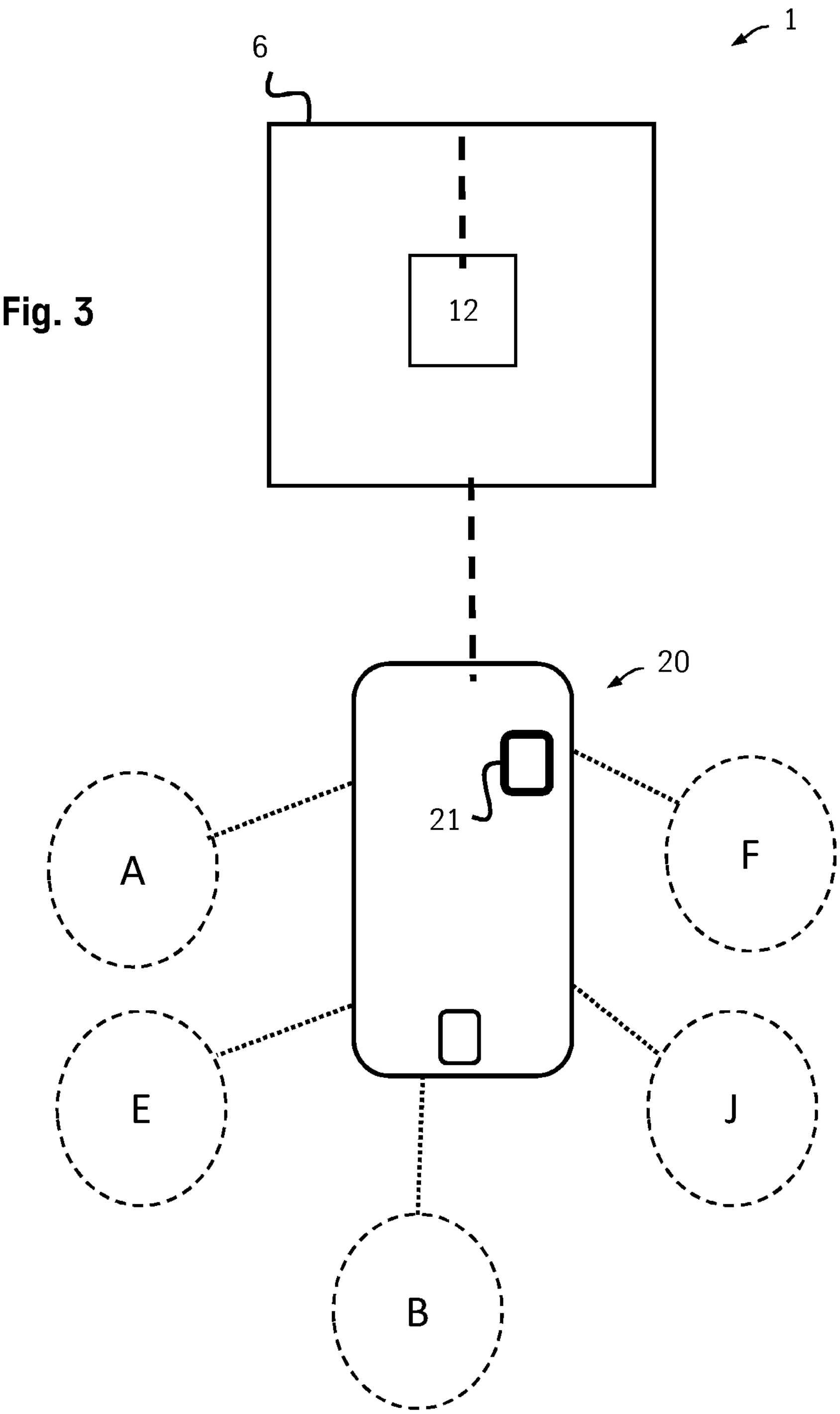
FIG. 3 shows a schematic representation of a control unit according to one or more embodiments shown and described in the present disclosure.

FIGS. 2*a* to 3 detail various embodiments of the inventive control unit 20. For ease of reference only the drive unit 6 of the stairlift 1 is illustrated. The first control unit 12 is connected, wirelessly or otherwise, to the drive unit 6. The remote control unit 20 is adapted to be wirelessly connected to i.e., "paired" with the drive unit 6 and is programmed to perform various functions i.e., functions A, to K, which removes the need to perform the same functions at the chair 8 via the control unit 12. The control unit 12 however, is still fully functioning.

Function A relates to "Pairing", i.e., the process of wirelessly connecting the remote control unit 20 with the drive unit 6—this ensures that any other functionality can be carried out. Without pairing, the remote control unit 20 cannot work, therefore in FIG. 2*a*, function A is the first basic function that the remote control unit 20 is adapted to perform. In this example, the remote control unit 20 is a hand held remote control.

During the pairing procedure, a frequency band is set in the control board of the drive unit 6, wherein said frequency band is based on a country specific setting. This is explained in further detail in the Applicant's patent application WO 2020/038794 A1.

The remote control unit 20 may also include any one or combination of functions B to K:

Function B relates to "Attendant Control" where an attendant person can use the remote control unit 20 to move the drive unit 6 over the entire rail 2, whilst walking up or down the stairs. This function can also be combined with the operation of an automatic folding functionality e.g., when the chair 8 includes a folding footrest. When using the "Attendant Control" functionality, the remote control unit 20 is adapted to function only within a range between approximately 1-3 m from the chair 8, in order for the attendant person to stay close to the person sitting on the chair. In this example, the range is up to 3 m. Therefore, if an attendant person is further than 3 m away from the person sitting on the chair 8, they cannot activate function B. However, this range is non-limiting and may be greater than 3 m or less than 1 m.

Function C relates to a "Repeater" (range extender). The purpose of this function comes into play when there are multiple floors over which the stairlift 1 travels. In these situations, the wireless signals involved may not be strong enough to reach the chair 8 and vice versa for example, when the chair 8 is several floors above or below the location of the remote control unit 20. By having the remote control unit 20 function as a repeater, it enables the stairlift 1 to be activated regardless of its position on the rail 2.

Function D relates to "Call & Park" as described earlier in relation to FIG. 1*a*. This function allows for the moving ("calling") of the stairlift to a dedicated boarding position or to a dedicated parking position. This function can also be combined with the operation of an automatic folding functionality e.g., when the chair 8 includes a folding footrest. Therefore not only can the stairlift be called to a certain location, but it can be adjusted accordingly to allow a user to enter it directly without having to further manipulate the controls at the chair 8. This improves user comfort and safety.

When using "Call & Park", the remote control unit 20 is adapted to function within a long range since it has to be able to call a stairlift 1 which is sitting at a terminal end of the rail from the opposite terminal end of the rail. In this example, the rail has a length of 35 m, therefore this function is designed to be activated within a range of up to 35 m from the chair 8.

Function E relates to a "Call device base station" which allows a user to make a phone call, for example by a DECT-based module, or a wi-fi based connection, which can optionally be incorporated into the remote control unit 20. A DECT module can be connected with for example, a microphone, a speaker or a command button. When a DECT module is used, a base station is needed to connect the DECT signals to a landline (see Applicant's application WO 2018/215238 which is herein incorporated by reference). By incorporating function E into the remote control unit 20, the holder of the remote control unit 20 e.g., a user or an attendant person, can implement this function and improve user safety.

Function F relates to a "Key-lock". This is designed to lock the stairlift 1 so that it is not responsive to a driving command initiated at the chair 8, e.g., a joystick command; an emergency lowering command; a folding or unfolding command, but it is responsive to a command initiated at the remote control unit 20. This is useful when multiple users are using the stairlift 1, e.g., when installed in a porch, or in a building with several apartments or in a hotel. In these situations, each user has to be able to call the lift to their desired boarding position on a particular floor before unlocking the user controls, e.g., joystick, emergency brake etc. In this case, the remote control unit 20 must be located somewhere that prevents unauthorized use, e.g., behind a door/desk, in a cabinet, so that only authorized persons can operate the lift 1.

Alternatively, the stairlift 1 can be locked entirely—including both the chair 8 and the remote control unit 20. Now the location of the remote unit 20 is no longer a concern. In order to unlock the stairlift 1, the user has to log on to the remote control unit 20 using e.g., a personalized RF-ID (see Applicant's patent application WO 2019238736 A1 for further information) which transmits a signal to unlock the stairlift 1 enabling a user to travel on it.

The functions G to J are normally included in the joystick 11, however, according to the present disclosure, they are also incorporated into the remote control unit 20 so that the joystick 11 and remote control unit 20 become harmonized.

Function G relates to specific driving commands. For example, to the command "Chair-user up/down". Such driving commands are usually comprised within a joystick unit at the chair 8, however according to the present disclosure, they can be introduced to the remote control unit 20.

Function H relates to a "Stairlift lock" wherein instead of using a key or an RF-ID device to unlock the stairlift 1, the control unit 12, is disabled. By introducing such a disabling feature into the remote control unit 20, it ensures no unauthorized access to the stairlift 1 and prevents abuse, thereby improving the lifespan of the lift 1.

Function J relates to a "Service unit". A service unit is normally associated with a control unit which is equipped with controls to change the configuration settings of a stairlift 1, e.g., phone numbers for the DECT module (e.g. function E), key-lock settings (e.g. function F), settings of the rail data (e.g., speed; swivel angles; boarding positions); sound or voice signals. Currently a service unit is provided via a dedicated service board in the drive unit of a stairlift. According to the present disclosure however, this function can be incorporated into the remote control device 20.

The remote control unit 20 is shown in various embodiments in FIGS. 2*b* to 6.

In FIG. 2*b*, the remote control unit 20 is arranged separately from the drive unit 6. In this example the remote control unit 20 is a hand held remote control and is programmed to perform the functions: A, B, C and D. Once the pairing function A is complete, any of functions B to D can be selected and performed. When for example, function B is selected, a wireless signal is sent to the drive unit 6 and the chair 8 responds accordingly. Should the chair 8 also have a foldable footrest, this function can control its folding and unfolding thereby removing the need to select this function on the chair 8 itself via the first control unit 12.

In FIG. 2*c*, the remote control unit 20 is arranged separately from the drive unit 6. In this example the remote control unit 20 is a hand held remote control and is programmed to perform the functions: A, B, C, D, E and F. Once the pairing function A is complete, any of functions B to F can be selected and performed, thereby removing the need to select it at the chair 8 via the first control unit.

In FIG. 3, the remote control unit 20 is arranged separately from the drive unit 6. In this example the remote control unit 20 is a smartphone and is programmed to perform the functions: A, B, E, F and J. In this case, the smartphone 20 is programmed via an application or "app" 21 which is downloaded and installed on the smartphone. As with the previous embodiments, pairing between the smartphone and the drive unit 6 of the stairlift 1 has to take place (function A). Once the pairing is complete, any of functions B, E, F and/or J can be selected and performed, thereby removing the need to select it at the chair 8.

Figure 4:
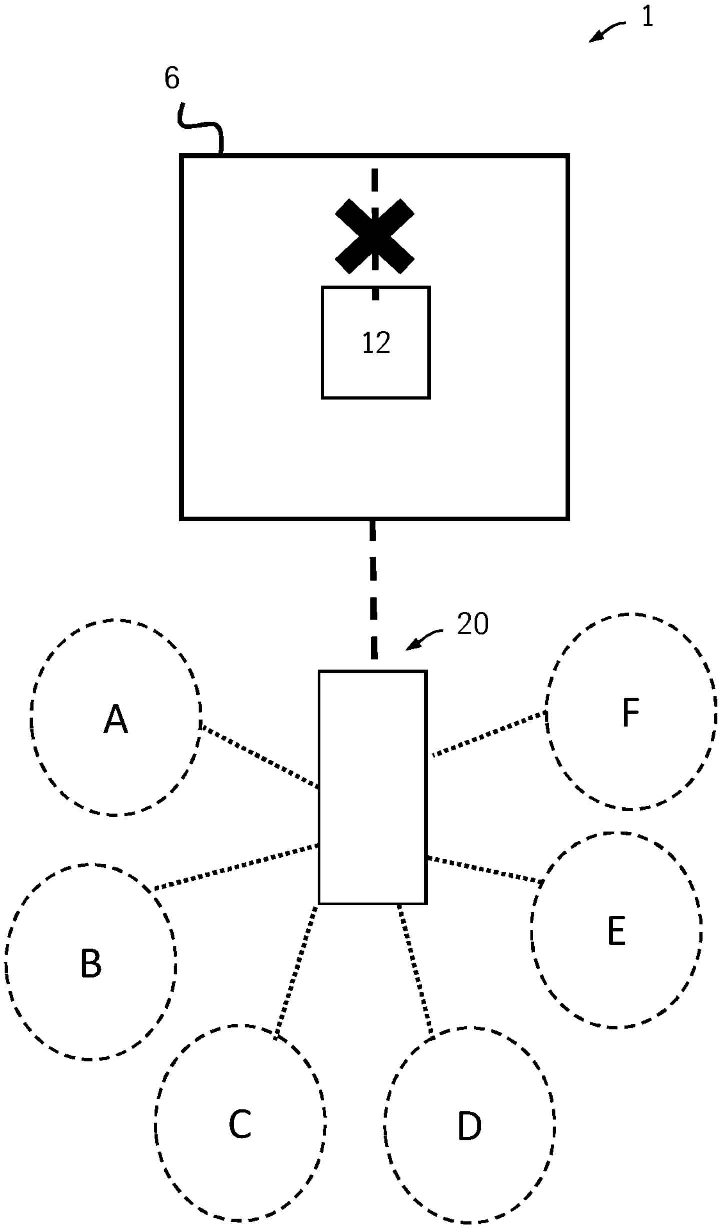
FIG. 4 shows a schematic representation of a control unit according to one or more embodiments shown and described in the present disclosure.

FIG. 4 shows a stairlift 1 when a malfunction (shown by the "x") has occurred in the connection between the first control unit 12 and the drive unit 6. In this situation, however, the remote control unit 20 is still capable of controlling the drive unit 6 since it has a separate connection. Therefore, the stairlift 1 is still able to provide service to a user—and can facilitate the user in reporting the malfunction e.g., via activating function E at the remote control unit 20.

It is to be understood that aspects of the various embodiments described hereinabove may be combined with aspects of other embodiments while still falling within the scope of the present disclosure. Accordingly, the foregoing description is intended to be illustrative rather than restrictive. The assembly of the present disclosure described hereinabove is defined by the claims, and all changes that fall within the meaning and range of equivalency of the claims are to be embraced within their scope.

The invention claimed is:

1. A stairlift system, comprising:
a stairlift having:
a rail;
a drive unit having a platform for driving along the rail; and
a first control unit operably connected via a first connection to the drive unit;
a remote control unit arranged separately from the drive unit and operably connected to the drive unit via a second connection different than the first connection,
wherein the first control unit and the remote control unit are adapted to control the drive unit independently of each other via the first connection and the second connection, respectively; and
the remote control unit is adapted to instruct the drive unit to perform multiple functions A-J via wireless transmission.

2. The stairlift system according to claim 1, wherein the multiple functions A-J further comprise:
pairing; and
at least one further function selected from the group comprising attendant control, repeater, and call and park.

3. The stairlift system according to claim 2, wherein the multiple functions further comprise any one or more of:
call device;
key lock;
chair-user up/down control;
stairlift lock; and
service unit.

4. The stairlift system according to claim 1, wherein:
the platform has a chair having a footrest, and at least one of the multiple functions B-J is adapted to control the folding and unfolding of the footrest.

5. The stairlift system according to claim 1, wherein:
the platform includes a lifting ramp for a wheelchair, the remote control unit is adapted to control the lifting ramp.

6. The stairlift system according to claim 5, wherein the lifting ramp further includes a guard.

7. The stairlift system according to claim 6, wherein the lifting ramp, including the guard are adapted to be operated by the remote control device.

8. The stairlift system according to claim 1, wherein the remote control unit is adapted to control the drive unit from a distance in a range of up to 45 meters.

9. The stairlift system according to claim 1, further comprising:
at least one of a mobile remote control, a fixed device, and a smartphone.

10. The stairlift system according to claim 1 wherein the remote control unit is adapted to replace the first control unit.

11. The stairlift system according to claim 1, wherein the first control unit and the remote control unit are adapted to simultaneously provide control signals to the drive unit.

12. A method of controlling a stairlift, the method comprising the steps of providing a remote control unit having a rail;
a drive unit having a platform for driving along the rail; and
a first control unit operably connected via a first connection to the drive unit;
wherein:
the remote control unit is arranged separately from the drive unit and operably connected to the drive unit via a second connection different than the first connection;
the first control unit and the remote control unit are adapted to control the drive unit independently of each other via the first connection and the second connection, respectively; and
the remote control unit is adapted to instruct the drive unit to perform multiple functions A-J via wireless transmission;
selecting function A at the remote control unit to pair the remote control unit with the drive unit; and
selecting at least one first further function B-J at the remote control unit.

13. The method according to claim 12, further comprising:

selecting at least one second further function B-J at the remote unit or the platform.

14. The method according to claim 13, wherein selecting function (B) at the remote control unit is within a distance of up to 5 meters of the platform.

15. The method according to claim 13, wherein selecting function (D) at the remote control unit (20) is within a distance in a range of up to 45 meters from the platform.

16. A stairlift system comprising:

a stairlift having:
a rail;
a drive unit having a platform for driving along the rail; and
a first control unit arranged at the drive unit; and
a remote control unit arranged separately from the drive unit,
wherein:
the first control unit and the remote control unit are adapted to control the drive unit independently of each other; and
the remote control unit is adapted to, via wireless transmission, instruct the drive unit to perform a plurality of functions including:
a pairing function configured to pair the remote control unit and the drive unit;
an attendant control function configured to permit a person to use the remote control unit to move the drive unit;
a range extender function configured to permit wireless communication between the remote control unit and the drive unit over a plurality of floors;
a call and park function configured to call the stairlift to a dedicated boarding position or a dedicated parking position;
a call device base station function configured to allow a user to make a phone call;
a key-lock function configured to lock the stairlift;
a specific driving commands function configured to move the stairlift;
a stairlift lock function configured to disable the stairlift; and
a service unit function configured to change the plurality of functions.

17. The stairlift system according to claim 16, wherein the platform has a chair having a footrest, and at least one of the plurality of functions is adapted to control the folding and unfolding of the footrest.

18. The stairlift system according to claim 16, wherein the remote control unit is adapted to control the drive unit from a distance in a range of up to 45 meters.

19. The stairlift system according to claim 16, further comprising:

at least one of a mobile remote control, a fixed device, and a smartphone.

20. The stairlift system according to claim 16 wherein the remote control unit is adapted to replace the first control unit.

* * * * *